(12) United States Patent
Fromby et al.

(10) Patent No.: US 8,733,205 B2
(45) Date of Patent: May 27, 2014

(54) MOTORCYCLE GEAR SHIFTER COVER

(75) Inventors: Derek Darnell Fromby, Akron, OH (US); Shasta Sadler, Akron, OH (US)

(73) Assignee: University of Akron Research Foundation, Akron, OH (US)

( * ) Notice: Subject to any disclaimer, the term of this patent is extended or adjusted under 35 U.S.C. 154(b) by 0 days.

(21) Appl. No.: 13/345,535

(22) Filed: Jan. 6, 2012

(65) Prior Publication Data

US 2013/0009383 A1     Jan. 10, 2013

Related U.S. Application Data

(60) Provisional application No. 61/430,580, filed on Jan. 7, 2011.

(51) Int. Cl.
*G05G 1/48* (2008.04)
*G05G 1/60* (2008.04)
*F16D 1/08* (2006.01)

(52) U.S. Cl.
USPC ................................. 74/563; 74/564; 403/344

(58) Field of Classification Search
USPC ............. 74/551.8, 551.9, 563, 564, 565, 566; 403/310, 311, 313, 344; 16/421, 422; 280/291; 180/90.6; 296/75
IPC .................................... B62J 25/00; G05G 1/483
See application file for complete search history.

(56) References Cited

U.S. PATENT DOCUMENTS

| | | | | |
|---|---|---|---|---|
| 1,421,098 | A * | 6/1922 | Phillips | 74/551.9 |
| 3,782,356 | A | 1/1974 | Hamman | |
| 4,785,495 | A * | 11/1988 | Dellis | 16/421 |
| 4,941,232 | A | 7/1990 | Decker et al. | |
| 5,482,307 | A * | 1/1996 | Lin | 280/291 |
| 5,638,723 | A * | 6/1997 | Lin | 74/564 |
| 5,673,597 | A * | 10/1997 | Lin | 74/563 |
| 5,687,617 | A | 11/1997 | Wells | |
| 6,161,859 | A | 12/2000 | Cheng | |
| 6,263,759 | B1 | 7/2001 | Hollingsworth | |
| 6,363,814 | B1 * | 4/2002 | Pease | 74/564 |
| D591,206 | S | 4/2009 | Donner | |
| D608,252 | S | 1/2010 | Warren | |

(Continued)

FOREIGN PATENT DOCUMENTS

WO     WO2007094964 A2     8/2007

OTHER PUBLICATIONS

"Shiftcush Home Page", Shiftcush, Oceanside, CA, 2011, www.shiftcush.com/index.html; 3 pp.

(Continued)

*Primary Examiner* — Marcus Charles
*Assistant Examiner* — Adam D Rogers
(74) *Attorney, Agent, or Firm* — George W. Moxon, II; Brian P. Harrod

(57) ABSTRACT

A motorcycle gear shifter cover comprising a pair of hemi-cylindrical halves, wherein each half has a first centered, symmetrical, cylindrical cavity for mounting on the shift peg of a of a motorcycle and comprises two layers, an outer layer and an inner layer, and wherein the outer layer and the inner layer share a common, concentric axis and wherein the outer layer has mating surfaces for joining and affixing said halves around a gear shift peg, and the inner layer contacts and holds the foot-operated gear shifter to prevent movement between the gear shifter and the gear shifter cover.

10 Claims, 2 Drawing Sheets

(56) References Cited

U.S. PATENT DOCUMENTS

| | | | |
|---|---|---|---|
| D610,050 S | 2/2010 | Madden | |
| 7,654,358 B2 | 2/2010 | Gilgallon | |
| 7,942,077 B2 | 5/2011 | Lai | |
| 2003/0037633 A1* | 2/2003 | Grilli et al. | 74/552 |
| 2004/0040407 A1* | 3/2004 | Chen | 74/551.9 |
| 2008/0047389 A1* | 2/2008 | LeClaire et al. | 74/564 |
| 2008/0173126 A1* | 7/2008 | Madden | 74/551.9 |
| 2009/0165907 A1 | 7/2009 | Hollingsworth | |
| 2009/0255093 A1* | 10/2009 | Hsu | 16/421 |
| 2009/0293421 A1* | 12/2009 | Erickson et al. | 52/787.12 |
| 2009/0320639 A1* | 12/2009 | Segato et al. | 74/551.1 |
| 2010/0011905 A1* | 1/2010 | Li | 74/551.9 |
| 2012/0073400 A1* | 3/2012 | Wang | 74/551.9 |

OTHER PUBLICATIONS

"Shiftcush, Press release", Shiftcush, Oceanside, CA, Jul. 20, 2005, www.shiftcush.com/pressrelease.html; 3 pp.
(Untitled Shiftcush parts), Shiftcush, Oceanside, CA, 2011, www.shiftcush.com/shiftcush_3_partsx600.jpg; 1 p.
"Shiftcush, about the inventor", Shiftcush, Oceanside, CA, www.shiftcush.com/about.html; 4 pp.
"Shift Sock", Ryder Clips Unlimited, Inc., Lighthouse Point, FL, www.ryderclips.com/buy_shiftsocks.php; 2 pp.
"Round Motorcycle Shift Peg Cover", Value Accessories, Madison, OH, http://store.valueaccessories.net/roundshiftpegcover.aspx; 2 pp.
"Kuryakyn Liberator Shift Peg or Stirrup Replacement Rubber", CruiserCustomizing, Inc., Livermore, CA, 2011, www.cruisercustomizing.com/images/image_26811_300.jpg; 1 p.
(Untilted Kuryakyn website image), Kuryakyn, Somerset, WI, 2011, www.kuryakyn.com/images/item/MainProduct/8021-1.jpg; 1 p.
"Shift Peg Cover", Rocky Mountain ATV/MC, Payson, UT, 2011, http://dirtbikesupplies.newhotshopping.com/Shift-Peg-Cover; 1 p.
"Biker's Choice O.E.M. Style Shifter Peg", Jake Wilson, Payson, UT, 2011, http://www.jakewilson.com/p/54/75/245/1326/-/-/172029/; 2 pp.
"Frequently Asked Questions", GripWorks, Arnold, MO, 2011, www.gripworks.com/gripworks-faqs.htm; 2 pp.
Jeff Sheets, "The Grip Evolution", Golfsmith Clubmaker, Aug. 2008, http://www.golfsmith.com/cm/display_page.php?page_num=cm_lp_mag0808_feature&ln=N; 2pp.
Walter Kern, "How to Shift Gears on a Motorcycle", Motorcycle Views, 2011, http://motorcycleviews.com/howtos/shiftgears.htm; 1 p.
"Gear Shifters", Dan's Motorcycle, 2011, www.dansmc.com/gearshifters.htm; 3 pp.
"Ball Lock Shifter Mechanism", Dan's Motorcycle, 2011, www.dansmc.com/ball_lock.jpg, 1 p.
"Change pedal-shift drum-sportshift lever", Dan's Motorcycle, 2011, www.dansmc.com/bs175_shifter.jpg; 1 p.
"Shifter Skinz", Shu-Band-It Inc., 2011, www.shubandit.com.

\* cited by examiner

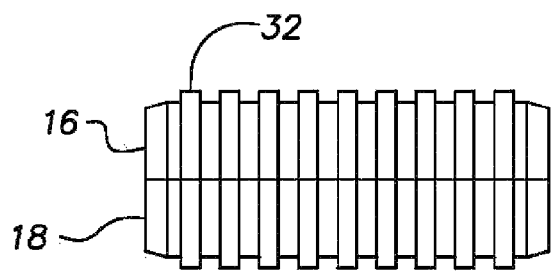
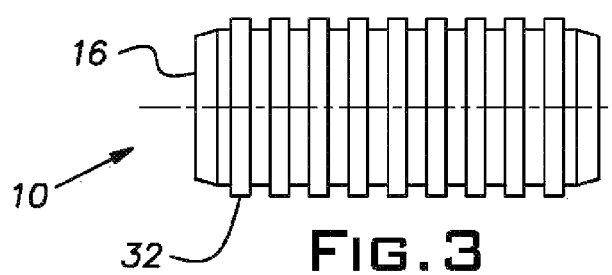
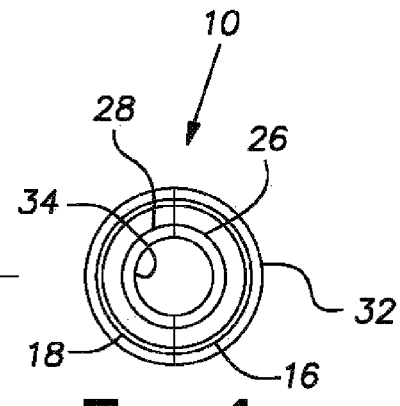
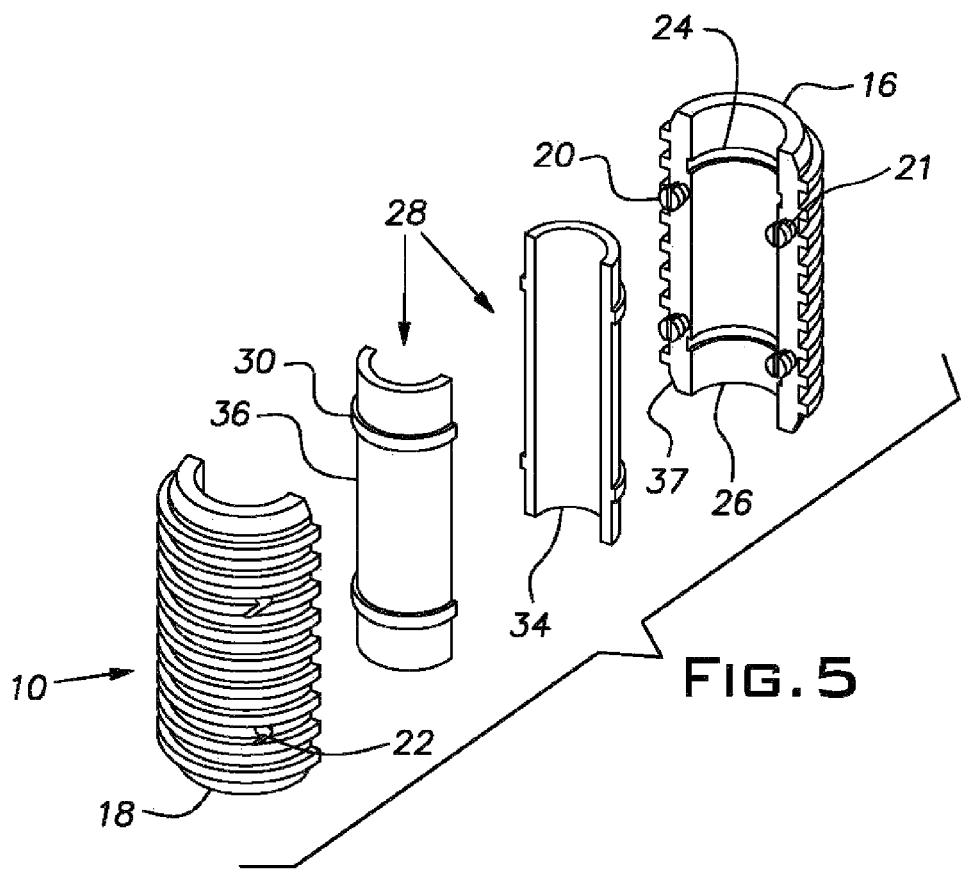

MOTORCYCLE GEAR SHIFTER COVER

CROSS-REFERENCE TO RELATED APPLICATIONS

The present invention claims the priority of provisional patent application Ser. No. 61/430,580 filed on Jan. 7, 2011, the disclosure of which is incorporated herein by reference.

BACKGROUND OF THE INVENTION

The present invention generally relates to custom accessories for a motor vehicle, such as a motorcycle. In particular, the present invention relates to a cover accessory for a motorcycle shifting mechanism, which can easily replace the existing gear shift and presents a non-marring surface. In this application, references to "lever," "shifting lever," "gear shift," or "gear shifter" refer to that portion of the gear shifting mechanism of a motorcycle's transmission that is typically parallel to the ground and designed to come into contact with the operator's foot as opposed to that portion of the shifting mechanism designed to function as a lever arm providing displacement from the gear box.

Consumers have shown a strong interest in customizing their motorcycles by adding accessories to enhance the appearance of the motorcycle, and this may include the replacement of the stock motorcycle basic black rubber gear shift lever. Gears in most motorcycles are changed via a foot-operated shifting lever while simultaneously actuating a hand-operated clutch lever on the handlebars. Such shifting levers require the operator to maneuver the lever up or down by lifting up or pushing down on the lever. For example, during the lifting motion, the operator positions his foot beneath the lever and lifts up so that the top of his shoe comes into contact with the bottom of the lever. On a typical motorcycle, the shift lever is comprised of a metal rod or peg which has a hard rubber covering, which usually contains carbon black or other abrasive fillers. The carbon black and fillers are used in the compounding of the rubber material and give it its typical characteristics. The carbon black can discolor surfaces with which it comes into frequent contact, and the filler material can abrade the upper part of the users shoe. The rubber is primarily disposed on the end portion of the lever that comes into contact with the shoe of the operator. During routine operation, the operator of such a vehicle will shift up and down quite frequently. Each time, the operator must manipulate the shifting lever with his foot. These actions bring both the top of the operator's shoe and the sole of the shoe into frequent contact with the shifting lever at the end where the hard rubber covers the metal. After such repeated shifting operations, the operator may experience scuff marks, dark carbon marks, or a wearing away of the shoe material. Also, it is not uncommon for the shoe to slip from the shifter while attempting to down shift.

SUMMARY OF THE INVENTION

The present invention involves a non-marring polymeric gear shifter cover designed to cover the shifting mechanism of motorcycles and similar transportation vehicles. The device is intended to be securely affixed to the gear shifter lever indefinitely, rather than be considered disposable and/or replaceable.

The present gear shifter cover invention is made of two hemicylindrical halves, which can be or are nearly identical. Each half is a composite construction in which a hard rubber material similar to a standard gear shifter lever is covered with a shell of polymeric material to form a coaxial construction. The inner construction comprises a rubber, or other similar material on the inner portion that provides a non-slip inner lining, and the outer construction provides an outer surface that is a durable, colorfast, slip-resistant thermoplastic polymeric material. The outer surface may or may not be coarsely textured, in order to enhance shoe grip properties. The inner lining and the outer surface are intimately joined through natural molecular bonding, mechanical fastening, or through the use of permanent adhesives. The thermoplastic polymeric material does not contain carbon black, or other abrasive colored fillers that often leave scuff marks on the rider's shoes.

The device is designed such that the thermoplastic polymer additionally offers good grip performance, water resistance, and aesthetic value, i.e. it may be easily colored to match the motorcycle. Most importantly, it does not discolor or mar the rider's shoes, particularly those that are white.

BRIEF DESCRIPTION OF THE DRAWINGS

The foregoing and other features and advantages of the present invention will become apparent to those skilled in the art to which the present invention relates upon reading the following description with reference to the accompanying drawings, in which:

FIG. 2 is a side view of the device showing the seam where the first portion of the outer layer meets the second portion of the outer layer in accordance with the present invention;

FIG. 3 is a top view of the device in accordance with the present invention;

FIG. 4 is an edge view of the device in accordance with the present invention; and FIG. 5 is an exploded view of the device, showing from left to right, the second portion of the outer layer, the two halves of the inner layer, and the first portion of the outer layer in accordance with the present invention;

DETAILED DESCRIPTION OF THE INVENTION

Figure 1:
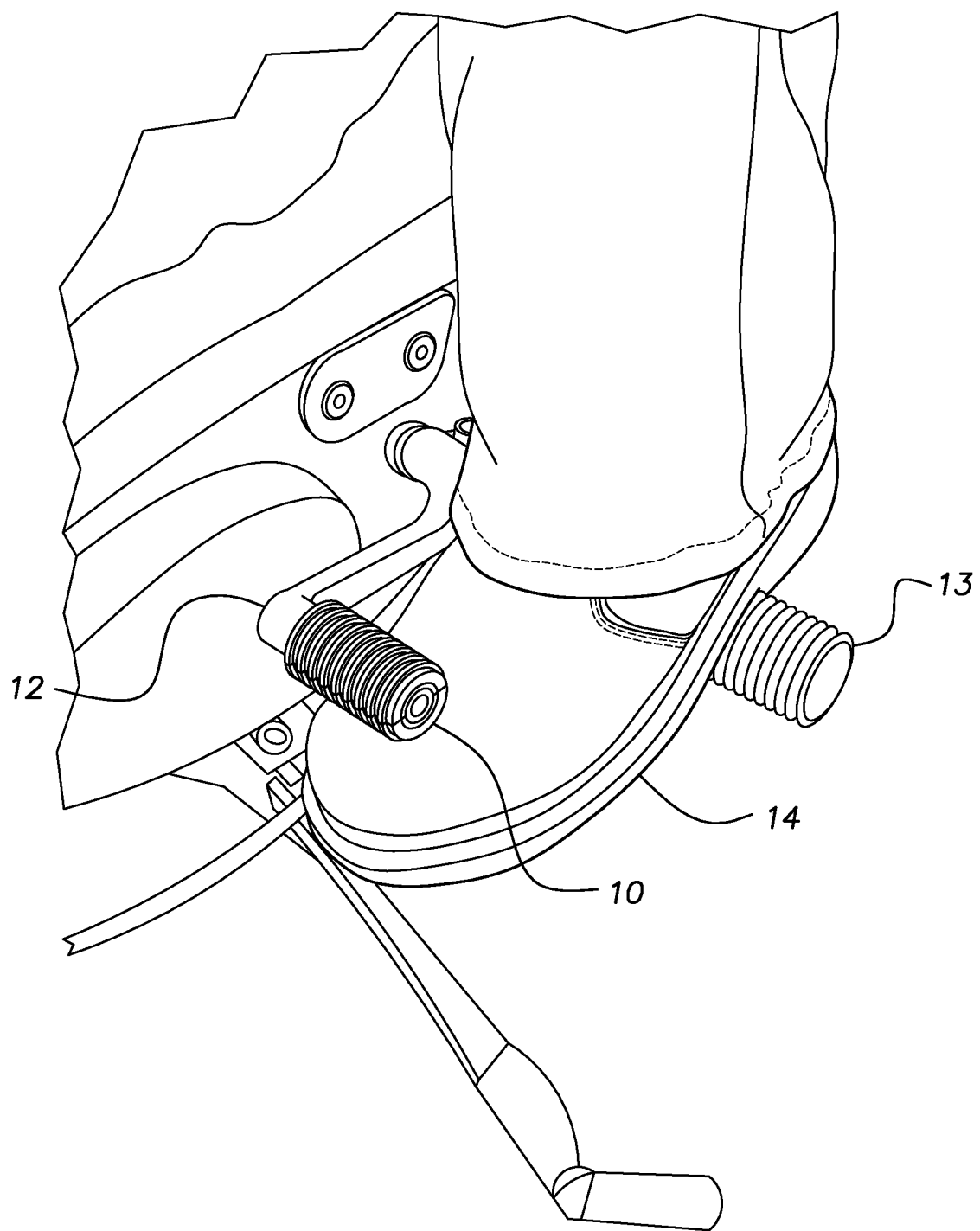
FIG. 1 is a perspective view of the cover showing the device installed on a shifter lever of a motorcycle wherein the rider's foot in positioned to upshift in accordance with the present invention.

The present gear shifter cover invention is made of two hemicylindrical halves, which can be or are nearly identical. Each half is a composite construction in which a hard rubber material similar to a standard gear shifter lever is covered with a shell of polymeric material to form a coaxial construction. The inner construction comprises a rubber, or other similar material on the inner portion that provides a non-slip inner lining, and the outer construction provides an outer surface that is a durable, colorfast, slip-resistant thermoplastic polymeric material. The outer surface may or may not be coarsely textured, in order to enhance shoe grip properties. The inner lining and the outer surface are intimately joined through natural molecular bonding, mechanical fastening, or through the use of permanent adhesives. The thermoplastic polymeric material does not contain carbon black, or other abrasive colored fillers that often leave scuff marks on the rider's shoes.

As noted previously, the gear shifter cover 10 is made of composite coaxial construction with an inner layer 28 of a hard rubber, or other similar material, coupled with an outer layer having a surface which is a durable, colorfast, slip-resistant thermoplastic polymeric material. The outer surface may or may not be textured with bands of ridges 32 in order to enhance shoe grip properties. The thermoplastic polymeric material does not contain carbon black, or other abrasive colored fillers, which can leave scuff marks on the rider's shoe 14 particularly those that are white. The cover may be easily colored to match the motorcycle.

The inner layer 28 is composed of rubber or similar material with a high coefficient of friction in order to properly grip the gear shifter lever 12 of the motorcycle. The inner layer 28 and the inner surface 26 of the outer layer are intimately joined through natural molecular bonding, mechanical fastening, or through the use of permanent adhesives.

FIG. 1 shows the motorcycle gear shifter cover 10 of the present invention positioned over a motorcycle gear shift 12 that is mounted on a motorcycle. The rider's shoe 14 is resting on top of the motorcycle footrest 13 and positioned under the motorcycle gear shifter cover 10 and oriented to perform an upshift operation on the motorcycle's transmission.

FIG. 2 shows in side view of the motorcycle gear shifter cover 10 in final assembled form wherein the first portion of the outer layer 16 is fastened to second portion of outer layer 18. A series of parallel bands of ridges 32 cover the circumference of motorcycle gear shifter cover 10.

FIG. 3 shows motorcycle gear shifter cover 10 as seen from above. Only the first portion of the outer layer 16 is visible. The bands of ridges 32 can be seen in this view as well.

FIG. 4 shows motorcycle gear shifter cover 10 as viewed from the end, along the axis of the motorcycle gear shifter. The inner layer 28 can be seen, with the innermost surface being the inner wall 34 of the inner layer. The inner layer 28 nests within first portion of the outer layer 16 and second portion of outer layer 18 and meets the inner wall of the outer layer 26. The bands of ridges 32 can be seen covering the entire 5 circumference of the motorcycle gear shifter cover 10.

As shown in FIG. 5, in one embodiment, the first portion or hemispherical half 16 is connected to the second portion or hemispherical half 18 via a series of pegs 20 which fit into matching openings and together result in the outer layer encasing the inner layer 28. The pegs 20 are formed as part of, and are integral to, the first portion of the outer layer 16 and extend perpendicularly from the mating surface 37 of first portion of the outer layer 16. The second portion of the outer layer 18 has a similar corresponding flat mating surface having a series of holes 22. The pegs 20 engage complementary connector holes 22 in the second portion of outer layer 18. The inner layer 28 is made up of two hemicylindrical halves like the outer layer, but unlike the outer layer, the two halves of the inner layer 28 are identical and interchangeable with neither half having connector pegs nor holes. The two halves of inner layer 28 are held together by pressure applied by the shell formed when the first portion of the outer layer 16 and the second portion of outer layer 18 are fastened together. When so fastened, the outer wall of the inner layer 36 is flush with the inner wall 34 of the outer layer. To prevent the 20 inner layer 28 from moving laterally and slipping out from between first portion of the outer layer 16 and the second portion of outer layer 18, the inner layer 28 is formed having a ridge 30 that mates with a corresponding groove 24 in each of the outer layers.

In another embodiment, the inner layer 28 is joined with the outer layers by means of chemical bonding. The outer wall of inner layer 36 is treated to bond chemically to the inner wall of outer layer 26, creating a permanent connection between the two layers. In another embodiment, the inner layer 28 is joined with the outer layers using an adhesive. This adhesive is applied to outer wall of inner layer 36 and to inner wall of outer layer 26, creating a permanent connection between the two layers. The particular adhesive is not critical with the current invention and any number of commercially available adhesives could be so employed, as long as they provide a bond between the inner rubber material and the outer polymeric material. Further, the ridges 30 and grooves 24 could optionally be omitted or spaced differently, as long as they create enough surface for the gear shift to function properly.

In another embodiment, the mating surface 37 of the first portion of outer layer 16 is joined with the corresponding mating surface of the second portion of outer layer 18 using an adhesive or chemical bonding as described above. In this embodiment, the pegs 20 could optionally be omitted. In yet another embodiment, the hemicylinders could be joined by a web of hinge material on one side and by pegs and holes on the other side such that the shifter will resemble a clam-shell design.

Alternatively, the arrangement of pegs 20 and holes 22 can be such that, rather than all pegs being located on the first portion of outer layer 16 and all holes being located the second portion of outer layer 18, half of the pegs and their corresponding holes are on one of the halves and a corresponding amount are on the other half. This would result in the halves being symmetrical and by rotating one of the halves 180°, the holes on one half would match up with the pegs on the other half. Using FIG. 5 as an example, instead of four pegs on the first portion of outer layer 16 and four holes in the second portion of outer layer 18, there would be two pegs on one side of the layer and two holes on the other side. The two halves would be identical in this arrangement, with no distinction between first and second layers. This arrangement could result in reduced manufacture costs as only a single piece would be manufactured having two pegs and two holes rather than two separate pieces manufactured, i.e., one with four pegs, one with four holes (see FIG. 5). Two of the holes would be visible in this embodiment when viewed from either the top or the bottom, whereas in the embodiment of FIG. 5, no holes are seen when viewed from the top. For aesthetic reasons, the embodiment shown in FIG. 5 might be favored. Yet another alternative would entail having each half having alternating pegs and holes. In this arrangement, the sequence would be peg, hole, peg, and hole (when there are four pegs and holes). The halves would be identical, but by rotating one of the halves 180°, the pegs and holes would match and the halves could be then joined by inserting the pegs in the holes.

The pegs 20 are manufactured with a small gap, or slit down their centers and a flange 21 running about the circumference of the end of the peg 20. This slit allows the pegs to compress slightly along their width, allowing the flange 21 on the end of the peg 20 to easily fit within the holes 22. Once the flange end of the peg emerges from the hole, the peg returns to its original shape and effectively expands so that the edge of the flange engages the lip around the hole, thus securing the two halves of the cover. Even if the flange end does not pass entirely through a hole, the compressed peg will exert a force against the inner wall of the hole, with the resulting pressure and friction thus securing the two halves of the cover.

In another embodiment, the cover has an additional outermost layer. This layer would be softer than the thermoplastic polymer. Such outermost layers take their example from golf club grips, and include such materials as leather and ethylene propylene diene monomer elastomer (EPDM).

Although the invention has been described in detail with reference to particular examples and embodiments, the examples and embodiments contained herein are merely illustrative and are not an exhaustive list. Variations and modifications of the present invention will readily occur to those skilled in the art. The present invention includes all such modifications and equivalents. The claims alone are intended to set forth the limits of the present invention.

What is claimed is:

1. A motorcycle gear shifter cover comprising a pair of hemicylindrical halves, wherein each half has a first centered, symmetrical, cylindrical cavity, shape for mounting on the shift peg of a foot-operated gear shifter of a motorcycle, said hemicylindrical halves comprising two layers, an outer layer and an inner layer, wherein said outer layer surrounds said inner layer and wherein said outer layer and said inner layer share a common, concentric axis and said first centered, symmetrical, cylindrical cavity, wherein said outer layer has an outer surface comprised of a plurality of equally spaced generally circular raised bands of ridges running parallel about its circumference which provide a grip surface for a rider's footwear, wherein said outer layer has a second centered, symmetrical, cylindrical cavity with a diameter equal to or larger than, an outer diameter of said inner layer, wherein said outer layer has an inner wall, wherein said inner layer has an outer wall, wherein said outer layer further comprises two hemicylindrical portions having mating surfaces, a first portion and a second portion, wherein said first portion comprises a single piece having a plurality of integral cylindrical pegs that are formed as a part of said first portion, protruding perpendicularly from said mating surface, wherein said second portion has a plurality of holes spaced to receive said pegs, wherein said inner layer further comprises two hemicylindrical portions, which contacts and holds via friction said foot-operated gear shifter of the motorcycle, and prevents rotational and lateral movement between the foot-operated gear shifter and said gear shifter cover, and wherein said inner layer and said outer layer are joined via a plurality of continuous raised ridges and grooves, wherein said raised ridges are arranged transversely along the axis running parallel about its circumference and which mate with the plurality of corresponding grooves arranged transversely along the axis, such that said plurality of raised ridges fit securely into said plurality of grooves to prevent lateral axial movement between said outer layer and said inner layer.

2. The motorcycle gear shifter cover of claim 1, wherein said outer layer is comprised of a colorfast thermoplastic polymeric material which does not mar, scuff, or otherwise discolor the rider's shoes.

3. The motorcycle gear shifter cover of claim 2, wherein said outer layer is comprised of a rigid or flexible thermoplastic polymer.

4. The motorcycle gear shifter cover of claim 3, where said thermoplastic polymer is selected from the group consisting of polyvinyl chloride, polypropylene, polyethylene, polyurethane, polyamide, polystyrene, polyester, polycarbonate or copolymers thereof.

5. The motorcycle gear shifter cover of claim 2, wherein said outer layer is comprised of a thermoplastic elastomer.

6. The motorcycle gear shifter cover of claim 5, wherein said elastomer has a durometer hardness of between 20 A and 100 A.

7. The motorcycle gear shifter cover of claim 1, wherein said plurality of raised ridges are on said outer wall of said inner layer, and said plurality of grooves are on said inner wall of said outer layer.

8. The motorcycle gear shifter cover of claim 1, wherein said inner layer is joined to said outer layer by bonding said inner layer to said outer layer with an adhesive.

9. The motorcycle gear shifter cover of claim 1
wherein each peg in said plurality of integral cylindrical pegs terminates in a free end, said free end having a flange running about its circumference which engages the inner surface of an individual hole in said plurality of holes in said second portion.

10. A motorcycle gear shifter cover comprising a generally cylindrical hollow tube having a first centered, symmetrical, cylindrical cavity, shaped to accept a foot-operated gear shifter of a motorcycle, said cover comprising two layers, an outer layer and an inner layer, wherein said outer layer surrounds said inner layer and wherein said outer layer and said inner layer share a common, concentric axis and said first centered, symmetrical, cylindrical cavity, wherein said outer layer has a second centered, symmetrical, cylindrical cavity with a diameter equal to or larger than an outer diameter of said inner layer, wherein said outer layer has an inner wall with two continuous parallel recessed grooves perpendicular to said concentric axis, wherein said inner layer has an outer wall, with an outer diameter, having two continuous parallel protruding ridges perpendicular to said concentric axis, such that said protruding ridges align and mate with said recessed groves and prevent lateral axial movement of said inner layer relative to said outer layer, wherein said outer layer has an outer surface comprised of ten equally spaced generally circular raised bands of ridges running parallel about its circumference which provide a grip surface for the rider's footwear, wherein said outer layer further comprises two hemicylindrical portions having mating surfaces, a top portion and a bottom portion, wherein said top portion consists of a single piece having four integral cylindrical pegs that are formed as a part of said first portion, protruding perpendicularly from said mating surface, wherein said second portion has four holes spaced to receive said pegs, wherein each peg in said four integral cylindrical pegs terminates in a free end, said free end having a flange running about its circumference which engages an inner surface of one of the four holes in said second portion, wherein said inner layer further comprises two hemicylindrical portions, wherein said portions are comprised of rubber which contacts and holds via friction said foot-operated gear shifter of the motorcycle, and prevents rotational and lateral movement between the foot-operated gear shifter and said gear shifter cover.

* * * * *